(12) United States Patent
Takayama et al.

(10) Patent No.: US 6,250,643 B1
(45) Date of Patent: *Jun. 26, 2001

(54) DAMPER PLATE AND METHOD FOR PRODUCING THEREOF

(75) Inventors: Hirokazu Takayama, Tokyo; Toshiyuki Ogawa; Atsushi Kaneko, both of Yokohama, all of (JP)

(73) Assignee: Ebara Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/132,850

(22) Filed: Aug. 12, 1998

Related U.S. Application Data

(62) Division of application No. 08/680,351, filed on Jul. 15, 1996, now Pat. No. 5,823,033.

(30) Foreign Application Priority Data

Jul. 17, 1995 (JP) .................................... 7-202829

(51) Int. Cl.$^7$ ...................................... F16J 15/54
(52) U.S. Cl. .................... 277/585; 277/644; 277/916; 277/940; 277/941; 277/943
(58) Field of Search ................. 277/916, 500, 277/644, 585, 939, 943, 941, 940; 74/574

(56) References Cited

U.S. PATENT DOCUMENTS

| 3,469,372 | 9/1969 | Yamauchi et al. ................ 72/60 |
| 4,399,895 | * 8/1983 | Kubo et al. ................ 192/3.29 |
| 4,474,044 | 10/1984 | Leistner et al. ................ 72/60 |
| 4,749,168 | * 6/1988 | Maxwell et al. ................ 251/174 |
| 4,873,810 | * 10/1989 | Lecaroz ................ 52/575 |
| 4,880,669 | * 11/1989 | Dorn et al. ................ 427/210 |
| 4,925,409 | * 5/1990 | Johnson ................ 440/52 |
| 5,222,745 | * 6/1993 | Akbar et al. ................ 277/591 |
| 5,259,443 | * 11/1993 | Osada et al. ................ 164/475 |
| 5,536,021 | * 7/1996 | Boehmer et al. ................ 277/207 R |
| 5,672,315 | * 9/1997 | Okato et al. ................ 420/40 |

OTHER PUBLICATIONS

"Superplasticity pulls ahead in metal forming", Iron Age, pp. 55–57, Nov. 1971.
"Superplasticity", *Science A Technology*, pp. 42–49 Sep. 1968.
F.R. Mallaire et al., "Evaluation of Wear Ring Seals for High–Speed, High–Pressure Turbopumps", Transactions of the ASME, *Journal of Lubrication Technology*, Jul. 1969, pp. 438–450, Figs. 18–20.

* cited by examiner

*Primary Examiner*—Anthony Knight
*Assistant Examiner*—Alison K. Pickard
(74) *Attorney, Agent, or Firm*—Armstrong, Westerman, Hattori, McLeland & Naughton

(57) ABSTRACT

There are disclosed a damper plate for a rotary machine and a method for producing thereof which makes it possible to produce a honeycomb-type damper plate with accurate dimensions and reasonable cost. In the method for producing a damper plate for sealing between a rotating portion and a stationary portion of a rotary machine and cushioning said rotating portion, the damper plate has a plurality of convex portions and concave portions, and a plurality of the convex portions and the concave portions are processed by a superplastic processing method.

7 Claims, 6 Drawing Sheets

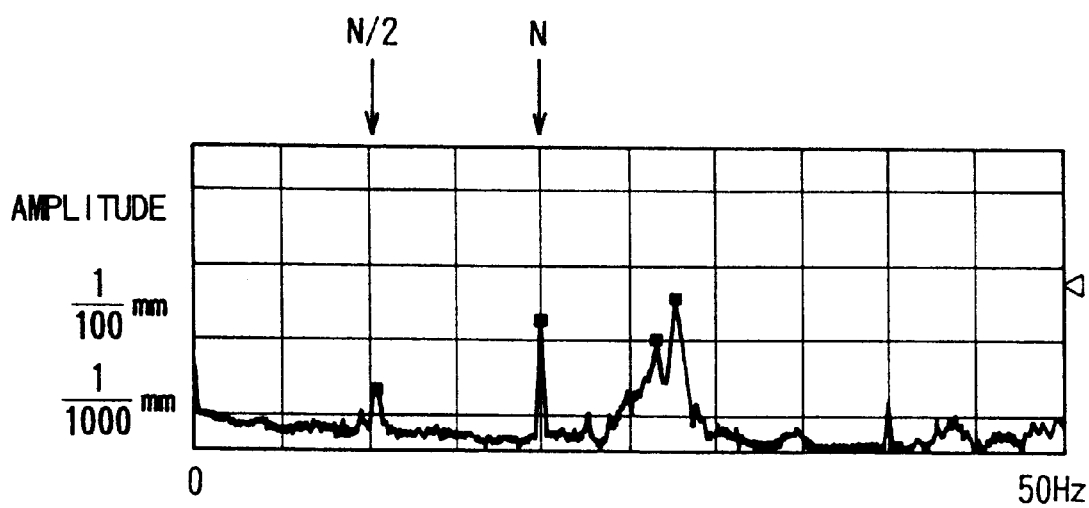
F I G. 5A
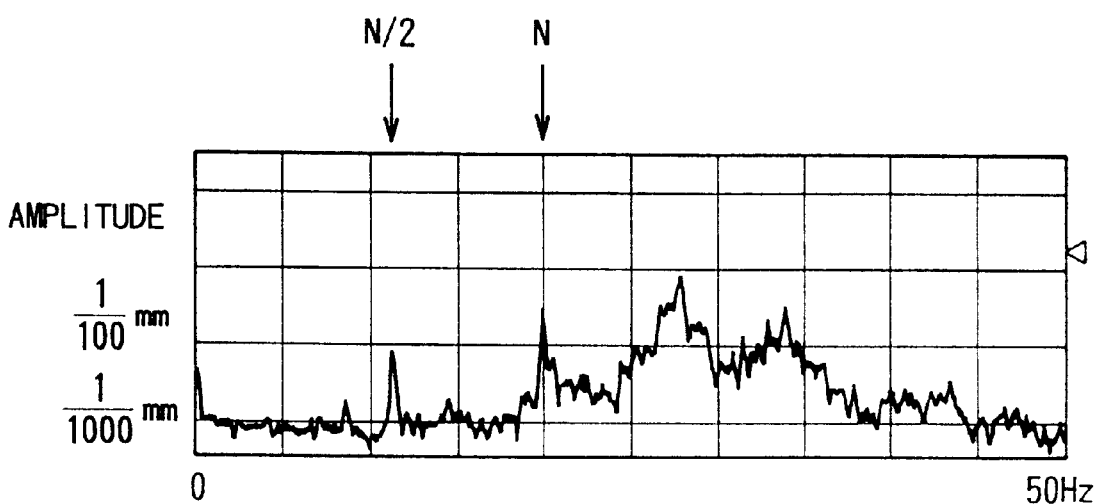
F I G. 5B

DAMPER PLATE AND METHOD FOR PRODUCING THEREOF

This application is a division of prior application Ser. No. 08/680,351 filed Jul. 15, 1996 now patented as U.S. Pat. No. 5,823,033 on Oct. 20, 1999.

BACKGROUND OF THE INVENTION

1. Field of the Invention

The present invention relates to a damper plate and a method for producing the damper plate, and more particularly to a damper plate used in a gap between an impeller and a casing, as a thrust pad or a radial pad of a slide shaft bearing, or at a sealing surface of a floating seal device in a rotary machine such as a pump.

2. Description of the Related Art

A damper plate is used in a rotary machine to reduce the amount of fluid leakage between a rotating body and a stationary portion so as to increase efficiency of the rotary machine and provide a cushioning or bearing effect to decrease deflection of the rotating body. Thus, the damper plate is required to be tough enough to withstand a contact with the rotating body which rotates at a high speed. The damper plate is also required to have accurate polygon patterns which perform the cushioning effect in response to the deflection of the rotating body. Also, the damper plate is preferred to be formed in a thin plate so that it can easily bend to fit a curved surface for easy mounting.

One of the examples of such a damper plate is a honeycomb plate shown in FIGS. 6A through 6D, having a plurality of convexoconcaves of a hexagonal cross-section. Conventionally, the honeycomb plate is produced by one of the following methods:

(1) Machine processing using a three-dimensional processing machine (2) Etching process using a thin film mask having a plurality of polygonally patterned holes attached on the metal plate (3) Laser beam processing using the energy of a laser beam Since it is difficult to shape convexoconcaves by one step with this method, the plate is first processed to have holes and then incorporated with a bottom plate by brazing or other adhering methods.

(4) Blasting method using a mask

A thin film mask has a plurality of polygonal holes and is secured to the metal plate, in the same way as the etching method. Blasting particles are ejected to define convexoconcaves thereon.

However, each of these methods has the following disadvantages:

(1) Machine Processing

Since fine processing is required, a tool used in the processing is easily worn out and a processing time is long.

(2) Etching Method

Since a periphery of the hole is also etched through the process, the accurate polygonal patterns cannot be achieved. Also, in order to perform a uniform etching, the selection of material is limited.

(3) Laser Beam Machining

A number of steps are required and the cost is expensive.

(4) Blasting Method

Since the thin film mask is also exhausted by the blasting, the processing can be performed only while the thin film remains, and thus deep concaves are difficult to be defined.

Also, since a hard or tough material cannot be processed, the materials useable in the process are limited.

For the foregoing reasons, there is required to provide a practical method for producing a honeycomb-type damper plate with a high dimensional accuracy and reasonable cost. Particularly, when a dimensional accuracy is not established, the gap between the damper plate and the rotating body needs to be larger to prevent contacts or galling therebetween. In this case, the rotary machine having a high performance and less vibration cannot be provided by employing the advantages of the honeycomb plate.

SUMMARY OF THE INVENTION

It is therefore an object of the present invention to provide a damper plate for a rotary machine and a method for producing the damper plate which makes it possible to produce a honeycomb-type damper plate having accurate dimensions and reasonable cost.

According to a first aspect of the present invention, there is provided a damper plate for sealing between a rotating portion and a stationary portion of a rotary machine and cushioning the rotating portion comprising: a superplastic material plate; and a plurality of convex portions and concave portions defined in the superplastic material plate, the plurality of convex portions and concave portions being formed by a superplastic processing method.

According to a second aspect of the present invention, there is provided a method for producing a damper plate for sealing between a rotating portion and a stationary portion of a rotary machine and cushioning the rotating portion comprising the steps of: preparing a superplastic plate; and defining a plurality of convex portions and concave portions in the superplastic plate by a superplastic processing method.

In the above invention, the superplastic material may be selected from the group consisting of austenitic stainless steel, two-phase stainless steel, aluminum alloy, titanium alloy and ceramics.

According to the present invention, the damper plate having polygonal patterns such as the honeycomb patterns, which is difficult to produce in the conventional methods, can be produced with accurate dimensions and reasonable cost. As a result, the present invention contributes to the improvement in the performance of the rotary machine. Further, since a wide variety of materials can be used in the process, a material of the desired hardness or softness can be selected to differentiate with the counter material. Thus, when an impeller of the rotary machine contacts the damper plate, excess galling can be avoided. Moreover, by joining a plurality of damper plates having the same patterns, it is possible to cover a desired surface of a complex shape. Thus, the present invention permits the damper ring of the rotary machine to provide a bearing effect. As a result, an industrial machine can be miniaturized and be light-weight.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIGS. 5A and 5B are graphs showing a result of a vibration inspection of the pump.

DETAILED DESCRIPTION OF THE PREFERRED EMBODIMENT

Hereinafter, a preferred embodiment of the present invention will now be described referring to the accompanying drawings.

Figure 1A:
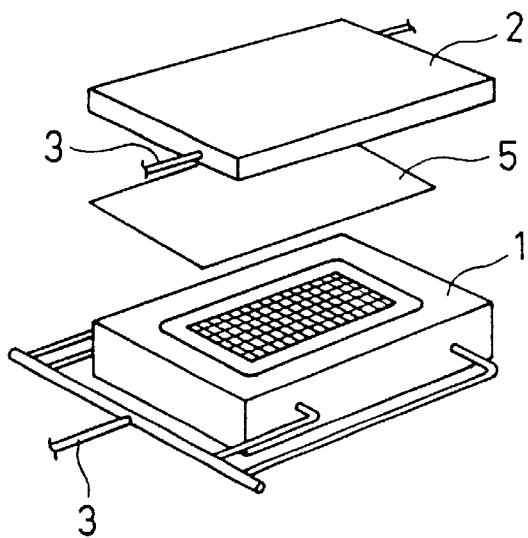
FIGS. 1A through 1D are perspective views showing a first step of a method for producing a damper plate of the present invention.
Figure 1B:
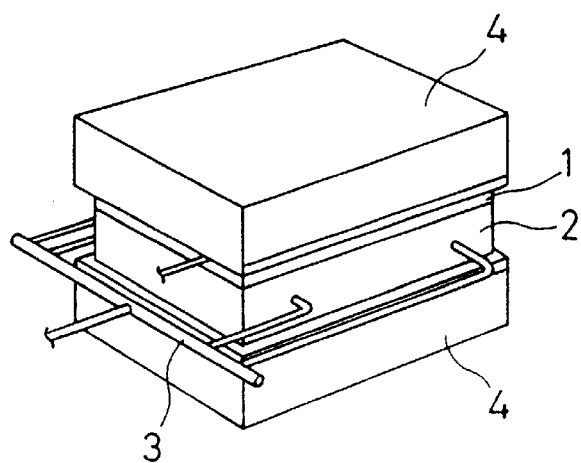

FIGS. 1A through 1D show a mold for molding a damper plate of the present invention, which includes a lower mold 1 and an upper mold 2. The lower mold has a surface having convex portions and concave portions which define concave portions and convex portions to be formed in the damper plate. The upper plate 2 covers the lower plate 1. In the upper mold 2 and the lower mold 1, there are provided gas passages for introducing a pressurizing gas to a material sheet and gas pipes 3 for introducing and discharging the gas to and from the material. The upper mold 2 and the lower mold 1 are held between ceramic platens 4 provided with a built-in heater for heating the molds 1, 2 to a specific temperature, as shown in FIG. 1A.

In a method for producing the damper plate, a thin plate 5 of a superplastic material is used as the material. Examples of the superplastic material include but are not limited to austenitic stainless steel, two-phase stainless steel, aluminum alloy, titanium alloy and ceramics.

Figure 1C:
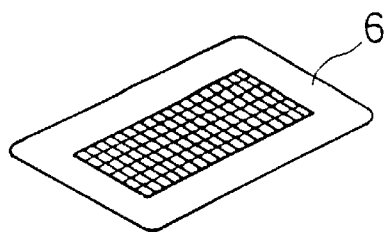
Figure 1D:
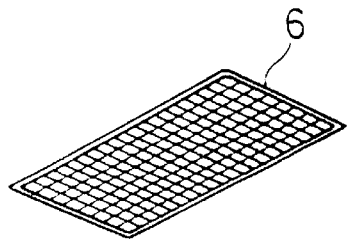

After the thin plate 5 is placed on the lower mold 1 in which a cavity is defined, the thin plate 5 is covered with the upper mold 2. The thin plate 5 is heated to a superplastic processing temperature and a pressure is applied to produce a honeycomb plate 6 having a plurality of polygonal convex portions and concave portions, as shown in FIG. 1C.

Figure 2A:
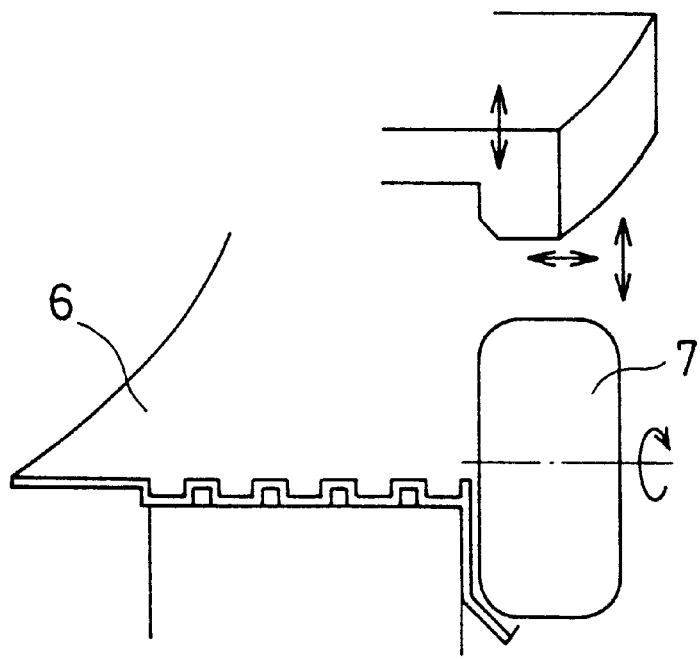
FIG. 2A is a perspective view showing a second step of the method for producing a damper plate of the present invention.
Figure 2B:
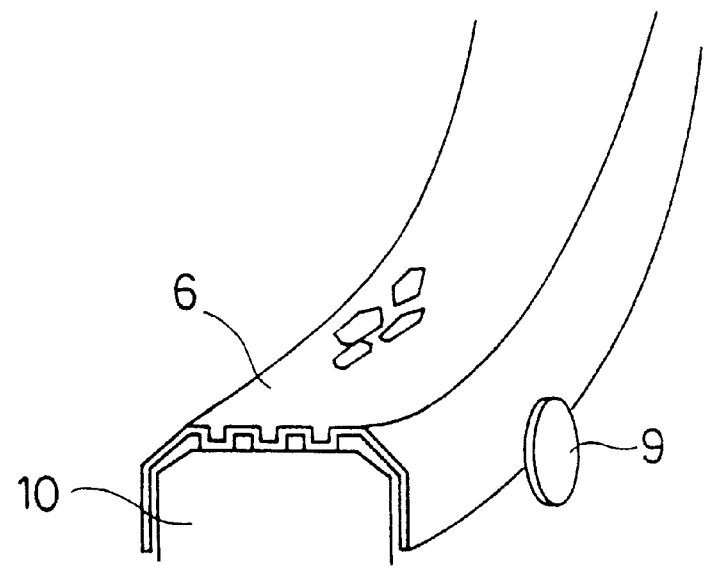
FIG. 2B is a perspective view showing a step for mounting the damper plate of the present invention in a pump casing.
Figure 3A:
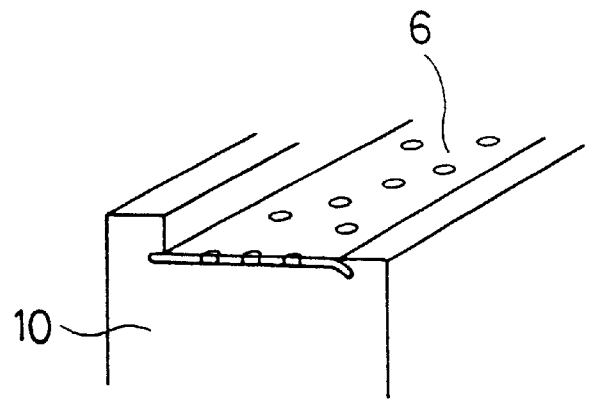
FIGS. 3A through 3D are perspective views showing other steps for mounting the damper plate of the present invention in the pump casing.
Figure 3B:
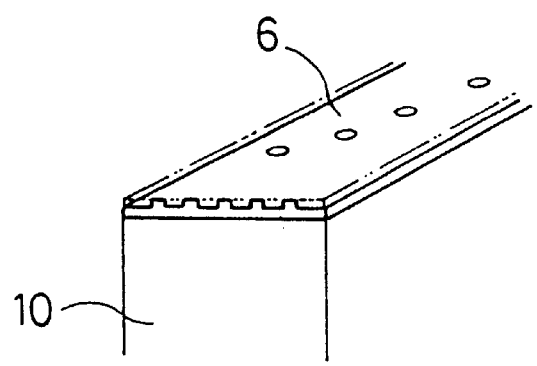
Figure 3C:
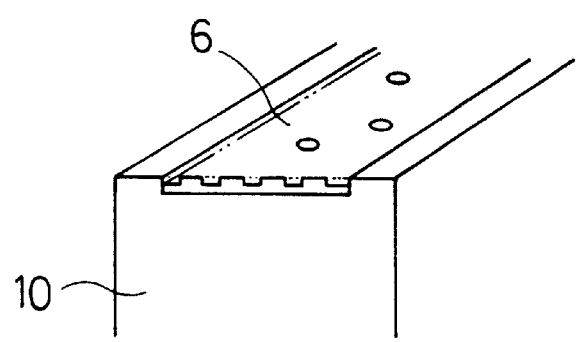
Figure 3D:
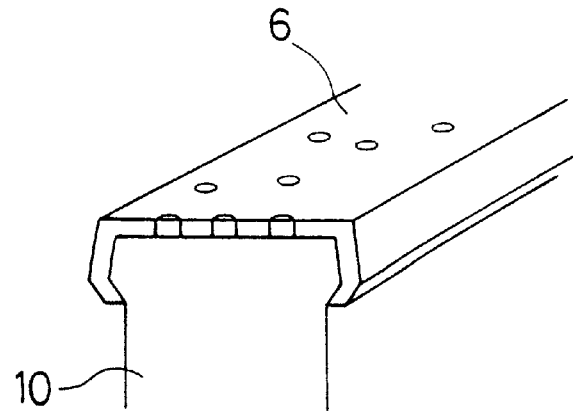

After the honeycomb plate is cut with dimensions corresponding to a portion to be fixed (FIG. 1D), the honeycomb plate is bent by a roll 7 corresponding to a specific curved or plane surface (FIG. 2A). After that, the honeycomb plate may be secured to a casing 10 by a lockscrew 9 (FIG. 2B), fit to the casing 10 (FIG. 3A), secured to the casing through an adhesive (FIG. 3B), secured in a groove formed on the casing through an adhesive (FIG. 3C), or secured by a bending method (FIG. 3D).

Figure 4:
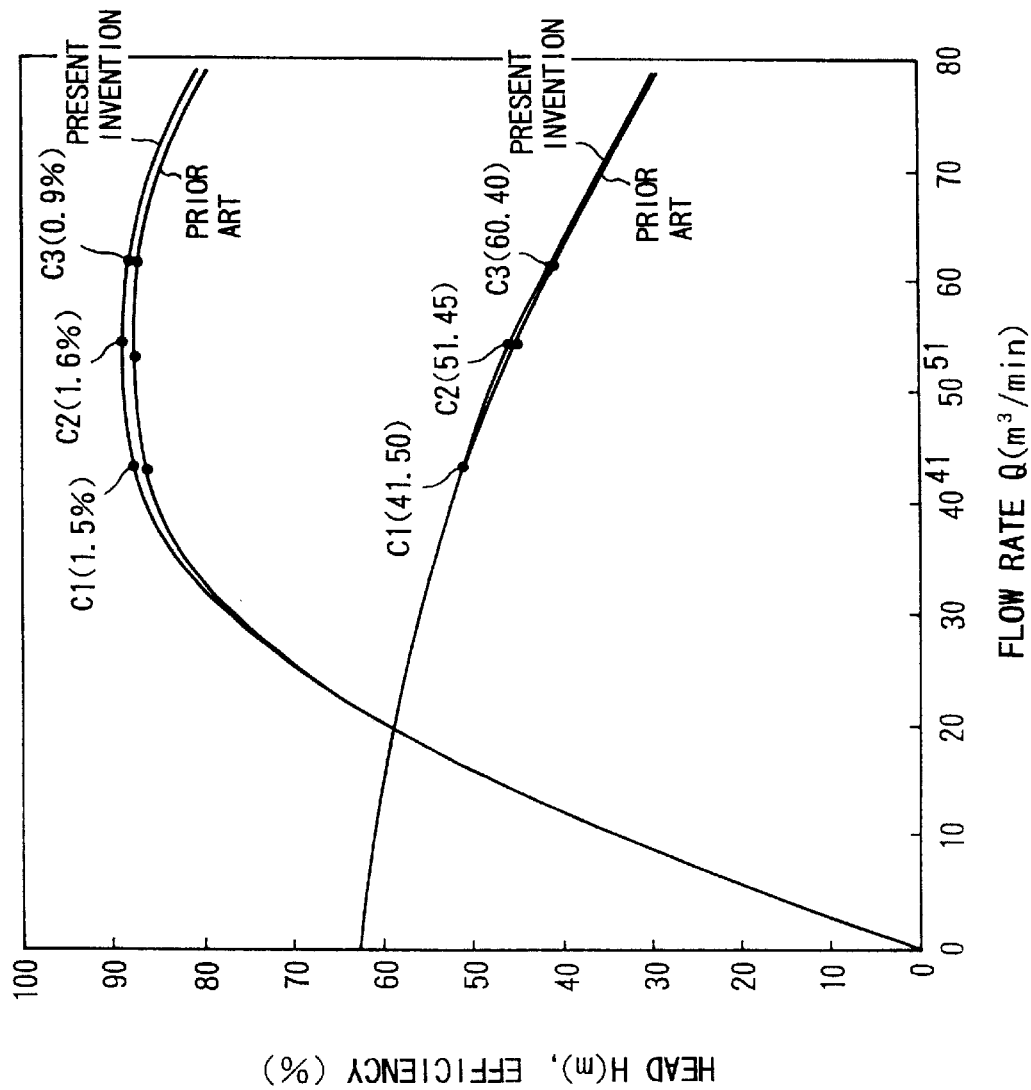
FIG. 4 is a graph showing a performance of the pump using the damper plate of the present invention.
Figure 6A:
FIGS. 6A through 6D are schematic illustrations showing the damper plate.
Figure 6B:
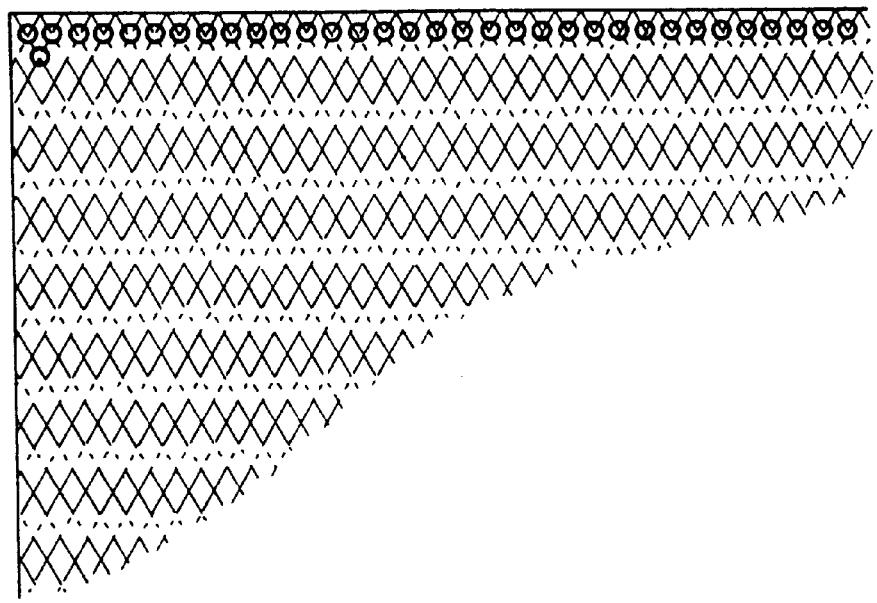
Figure 6C:
Figure 6D:
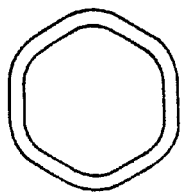

Hereinafter, a performance test of the damper plate produced by the above-described method when used in the rotary machine (pump) will be described. Performance of the pump is shown in FIG. 4.

The specification of the thin plate used was as follows:

Thickness of the plate: 0.3 mm
Material of the plate: SUS329J4L two-phase stainless steel Component of the plate: (%)

| Cr | Ni | Mo | N | Fe |
|---|---|---|---|---|
| 25.0 | 6.3 | 3.2 | 0.1 | Residual |

The condition for a superplastic processing is as follows:
Heat temperature: 900–1000° C.
Applied pressure: 20 kgf/cm2
Molding furnace: Argon gas atmosphere furnace
Bending process: Roll bending processing by a shear roll and a lower mold A gap size between the impeller mouth ring and the damper seal was 0.05 mm (half the conventional example).

Though the gap size was set a half of that formed by the conventional machine processing as described above, abrasion due to galling and contact with the rotating body was not observed and the pumping efficiency was improved by approximately 2%. The reason for preventing the galling and the contact is that the dimensional accuracy is much improved compared with that provided by the conventional method and the material selected here is softer than the conventional material, austenitic stainless steel SNS304.

The improvement of the pumping efficiency is achieved for a following reason. By the damper plate 6 provided between the impeller and the casing 10, the fluid is sealed within the gap as the gap becomes smaller, and the fluid applies a pressure to the facing surface of the impeller to maintain the specific gap so as to perform bearing function therebetween. This bearing function creates a cushioning function for reducing the vibration of the rotary machine as well as for enabling to minimize the initial size of the gap to reduce leakage of the fluid.

FIG. 5A is a graph showing a result of a vibration inspection of the rotary machine during the above experiment. As is apparent from the drawing, the vibration is reduced to ½ and ⅓ of that of the conventional pump shown in FIG. 5B at a designed rotational speed N and ½N, respectively.

Although certain preferred embodiments of the present invention have been shown and described in detail, it should be understood that various changes and modifications may be made therein without departing from the scope of the appended claims.

What is claimed is:

1. A damper plate for sealing between a rotating portion and a stationary portion of a rotary machine and cushioning said rotating portion comprising:
   a superplastic material plate; and
   a plurality of convex portions and concave portions defined in said superplastic material plate, wherein said superplastic material is selected from the group consisting of austenitic stainless steel, two-phase stainless steel, aluminum alloy, titanium alloy and ceramics, and wherein said superplastic material plate has a thickness of substantially 0.3 mm.

2. A damper plate according to claim 1, wherein said superplastic material is two-phase stainless steel which includes about 25.0% Cr.

3. A damper plate according to claim 1, wherein said superplastic material is two-phase stainless steel which includes about 6.3% Ni.

4. A damper plate according to claim 1, wherein said superplastic material is two-phase stainless steel which includes about 3.2% Mo.

5. A damper plate according to claim 1, wherein said superplastic material is two-phase stainless steel which includes about 0.1% N.

6. A damper plate according to claim 1, wherein said superplastic material is two-phase stainless steel which comprises 25.0% Cr, 6.3% Ni, 3.2% Mo, 0.1% N, and balance Fe.

7. A damper plate for sealing between a rotating portion and a stationary portion of a rotary machine and cushioning said rotating portion comprising:

a superplastic material plate having a thickness of substantially 0.3 mm; and a plurality of convex portions and concave portions defined in said superplastic material plate, wherein said superplastic material plate is integrally provided with a bent portion for attaching said superplastic plate to a rotating portion or a stationary portion of said rotary machine.

* * * * *